US006958412B2

(12) United States Patent
Jong et al.

(10) Patent No.: US 6,958,412 B2
(45) Date of Patent: Oct. 25, 2005

(54) METHOD FOR THE PREPARATION OF PENTAFLUOROPHENYLACRYLATE POLYMER

(75) Inventors: Shean-Jeng Jong, Tao-Yuan (TW); Chang-Chih Lin, Tao-Yuan (TW); Yu-Sheng Lin, Tao-Yuan (TW)

(73) Assignee: Chung-Shan Institute of Science & Technology, Tao-Yuan (TW)

( * ) Notice: Subject to any disclaimer, the term of this patent is extended or adjusted under 35 U.S.C. 154(b) by 77 days.

(21) Appl. No.: 10/669,501

(22) Filed: Sep. 25, 2003

(65) Prior Publication Data

US 2005/0032996 A1 Feb. 10, 2005

(51) Int. Cl.$^7$ ................................................ C07C 69/52
(52) U.S. Cl. ........................ 560/139; 560/140; 526/243; 525/326.4
(58) Field of Search ................................ 560/139, 140; 526/243; 525/326.4

(56) References Cited

U.S. PATENT DOCUMENTS 6,191,224 B1 * 2/2001 Chan et al. .................. 525/195
6,288,266 B1 * 9/2001 Moore et al. ............... 560/139

\* cited by examiner

*Primary Examiner*—Robert D. Harlan
(74) *Attorney, Agent, or Firm*—Bacon & Thomas, PLLC

(57) ABSTRACT

A method for synthesizing a pentafluorophenyl acrylate polymer includes bulk polymerizing a pentafluorophenyl acrylate monomer in the presence of a free radical initiator. The reactant mixture was subjected to an ultrasonication treatment, so that the mixing of the initiator and the monomer is enhanced; carried out the bulk polymerization at 25–99° C. for a period of time, and at 100–200° C. under a vacuum pressure for another period of time to complete the bulk polymerization, so that residue amounts of the initiator, unreacted monomer and oligomer of the monomer are reduced in the resulting reaction mixture.

9 Claims, 1 Drawing Sheet

METHOD FOR THE PREPARATION OF PENTAFLUOROPHENYLACRYLATE POLYMER

FIELD OF THE INVENTION

The present invention is related to a process for preparing a pentafluorophenyl acrylate polymer, and in particular to a process for preparing a pentafluorophenyl acrylate polymer by bulk polymerization.

BACKGROUND OF THE INVENTION

Acrylate polymer is a highly transparent polymer and is suitable for use as a material for making long distance optical telecommunication products. However, C—H bonds of the acrylate polymer will absorb signals having a wavelength of 1.2–1.6 $\mu$m used in the telecommunication, which results in an optical loss. Halogen-containing acrylates having a less number of C—H bond have been developed and used, as a replacement of the acrylate polymer, for making improved optical telecommunication products in terms of a lower optical loss. Pentafluorophenyl acrylate polymer is one of these halogen-containing acrylates.

There are two methods for preparing the pentafluorophenyl acrylate polymer, which are solution polymerization and bulk polymerization. EP 0824096 (1998) discloses a process for bulk polymerizing pentafluorophenyl acrylate monomer in an organic solvent a free radical initiator. In Example 25 of EP 0824096, 3.48 g of pentafluorophenyl acrylate (FW=252.15, 13.8 mmoles), 12.2 mg of AIBN (2,2'-azobisisobutyronitrile, FW=164.21, 0.074 mmoles) were dissolved in 17.3 ml of 2-butanone (methyl ethyl ketone) in a 50 ml three-necked flask, provided with a magnetic stirring bar, vacuum/nitrogen line, and an oil bath. After careful degassing of the reaction mixture to expell oxygen, the polymerisation was started by heating and stirring the flask's contents to about 60° C. under the exclusion of atmospheric oxygen. After 20 hours, the polymerization was discontinued, the solvent was almost completely removed by means of a rotary evaporator, the residue was redissolved in 6.5 ml of tetrahydrofurane, and the dissolved polymer was recovered through precipitation in methanol (75 ml) and filtration through a G4 glass filter. After drying in order to remove residual methanol/tetrahydrofurane (20 hours, 40° C., in vacuo), 2.3 g of poly(pentafluorophenyl)acrylate were obtained (yield about 66%) (Mw=35,800; Mn=13,415, polydispersity 2.7). The process disclosed in this European patent application not only requires the use of organic solvents in the polymerization and purification steps, but the process per se is complicated.

FR 2623510 (1989) and J. Fluorine Chem., 97, 191 (1999) both disclose bulk polymerizations of pentafluorophenyl acrylate polymer. The former uses AIBN as a initiator and dodecane thiol as a chain transfer agent, and the latter uses a photoinitiator and a thermal radical initiator to undergo a two-stage reaction. Even though these two prior art processes do not use an organic solvent, and are easier to be carried out, the polymerization products contain unreacted monomer and polymers of low polymerization degree, which deteriorate the thermal properties and quality of the polymerization products. As a result, the processing ability of the polymerization products prepared by these two prior art processes is adversely affected.

SUMMARY OF THE INVENTION

The present invention provides a process for preparing a pentafluorophenyl acrylate polymer by bulk polymerizing a pentafluorophenyl acrylate monomer in the presence of a radical initiator. The reaction mixture is subjected to an ultrasonication treatment, so that the mixing of the initiator and the monomer is enhanced. The bulk polymerization is carried out at a first temperature of 25–200° C. for a first period of time, and at a second temperature of 25–200° C. and higher than the first temperature under a vacuum pressure for a second of time to complete the bulk polymerization, so that residue amounts of the initiator, unreacted monomer and oligomer of the monomer are reduced in the resulting product mixture, and thus the processing ability of the resulting product mixture is improved.

Preferably, said radical initiator is 2,2'-azobisisobutyronitrile.

Preferably, an amount of said radical initiator used in the reaction mixture ranges from 0.001 to 1 mole, and more preferably 0.006 mole, per mole of the pentafluorophenyl acrylate monomer.

Preferably, said second temperature ranges from 100 to 200° C., said vacuum pressure ranges from 0.1 to 30 mmHg, and said second period of time ranges from 4 to 36 hours. More preferably, said second temperature is about 140° C., said vacuum pressure is about 0.3 mmHg, and said second period of time is about 12 hours.

Preferably, said first temperature ranges from 25 to 99° C., and said first period of time ranges from 4 to 36 hours. More preferably, said first temperature is about 60° C., and said first period of time is about 12 hours.

DETAILED DESCRIPTION OF THE INVENTION

Figure 1:
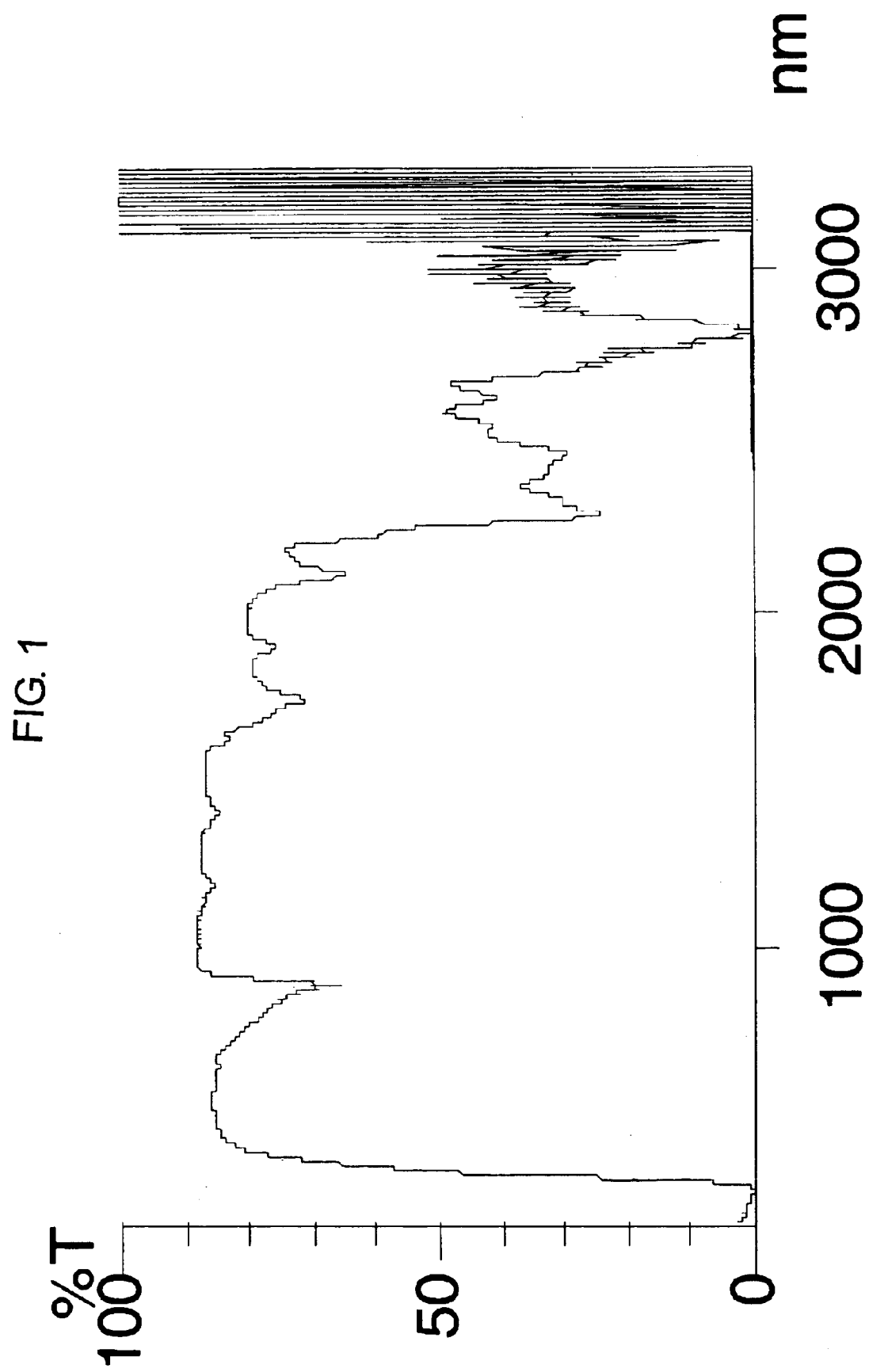
FIG. 1 shows transmission percentages (% T) of the polymerization product prepared in Example 1 of the present invention at various wavelengths (nm).

The invention of the present application provides a process for bulk polymerizing pentafluorophenyl acrylate monomer in the presence of a radical initiator. The initiator is a solid and substantially not soluble in the monomer. The inventors of the present application use an ultrasonication treatment at the beginning of the polymerization to break the initiator particles and to enhance the mixing of the initiator and the monomer, so that the bulk polymerization can undergo more uniformly. The bulk polymerization is carried out at a first temperature of 25–200° C. for a first period of time, and at a second temperature of 25–200° C. and higher than the first temperature under a vacuum pressure for a second of time to complete the bulk polymerization. The higher second temperature can assure the decomposition and the exhaustion the initiator. In addition, the vacuum pressure applied within the second period of time can reduce the residue amounts of the initiator, if any, unreacted monomer and oligomer of the monomer in the resulting product mixture.

The present invention will be better understood from the following examples which are for illustration and nor for limitation of the scope of the present invention.

EXAMPLE 1

0.006 g (0.036 mmol) of AIBN was added to 1.74 g (6 mmol) pentafluorophenyl acrylate monomer, and the resulting mixture was subjected to an ultrasonication treatment for 1.5 minute. The mixture was then heated at 60° C. for 12 hours under a nitrogen atmosphere, and heated at 140° C. and under a vacuum pressure of 0.3 mmHg for another 12 hours to obtain a transparent product. It can be seen from FIG. 1 that the transmission percentages (% T) of the product is about 80% or higher within 200–1700 nm wavelength.

The average molecular weight of the product was measured by gel permeation chromatography (GPC), and the results are listed as follows:

| $M_n$* | $M_w$* | $M_p$* | $M_w/M_n$ (polydispersity) |
|---|---|---|---|
| 26379 | 89254 | 132091 | 3.28 |

*$M_n$: number average molecular weight; $M_w$: weight average molecular weight; $M_p$: molecular weight peak value The product was subjected to thermogravimetric analysis (TGA), and the results indicate that the weight loss is 1.6% at 277° C., and 5% weight loss is at 344° C.

CONTROL EXAMPLE 0.006 g (0.036 mmol) of AIBN was added to 1.74 g (6 mmol) pentafluorophenyl acrylate monomer, and the resulting mixture was subjected to an ultrasonication treatment for 1.5 minute. The mixture was then heated at 60° C. for 24 hours under a nitrogen atmosphere to obtain a transparent product.

The product was subjected to thermogravimetric analysis (TGA), and the results indicate that the weight loss is 5.1% at 272° C., and 10.2% at 344° C.

In comparison with Control Example, the product prepared in Example 1 exhibits significantly superior thermal properties.

What is claimed is:

1. A process for preparing a pentafluorophenyl acrylate polymer by bulk polymerizing a reaction mixture comprising a pentafluorophenyl acrylate monomer and a radical initiator, wherein the radical initiator is not soluble in the pentafluorophenyl acrylate monomer, wherein the improvement comprises subjecting the reaction mixture to an ultrasonication treatment, so that the mixing of the initiator and the monomer is enhanced; carrying out the bulk polymerization at a first temperature of 25–200° C. for a first period of time; and carrying out the bulk polymerization at a second temperature of 25–200° C. under a vacuum pressure for a second period of time, wherein the second temperature is higher than the first temperature for another period of time, so that residue amounts of the radical initiator, unreacted monomer and oligomer of the monomer are reduced in the resulting product mixture.

2. The process according to claim 1, wherein said radical initiator is 2,2'-azobisisobutyronitrile.

3. The process according to claim 1, wherein an amount of said radical initiator used in the reaction mixture ranges from 0.001 to 1 mole per mole of the pentafluorophenyl acrylate monomer.

4. The process according to claim 3, wherein the amount of said radical initiator used in the reaction mixture is about 0.006 mole per mole of the pentafluorophenyl acrylate monomer.

5. The process according to claim 1, wherein said second temperature ranges from 100 to 200° C., said vacuum pressure ranges from 0.1 to 30 mmHg, and said second period of time ranges from 4 to 36 hours.

6. The process according to claim 5, wherein said second temperature is about 140° C., said vacuum pressure is about 0.3 mmHg, and said second period of time is about 12 hours.

7. The process according to claim 1, wherein said first temperature ranges from 25 to 99° C., and said first period of time ranges from 4 to 36 hours.

8. The process according to claim 1, wherein said first temperature is about 60° C., and said first period of time is about 12 hours.

9. A process for preparing a pentafluorophenyl acrylate homopolymer by bulk homopolymerizing a reaction mixture comprising a pentafluorophenyl acrylate monomer and a radical initiator, wherein the radical initiator is not soluble in the pentafluorophenyl acrylate monomer, wherein the improvement comprises subjecting the reaction mixture to an ultrasonication treatment, so that the mixing of the initiator and the monomer is enhanced; carrying out the bulk homopolymerization at a first temperature of 25–200° C. for a first period of time; and carrying out the bulk homopolymerization at a second temperature of 25–200° C. under a vacuum pressure for a second period of time, wherein the second temperature is higher than the first temperature for another period of time, so that residue amounts of the radical initiator, unreacted monomer and oligomer of the monomer are reduced in the resulting product mixture.

* * * * *